S. TEACHOUT.

WATER-WHEEL.

No. 6,940. Reissued Feb. 22, 1876.

Witnesses:
Allen Tenny
William S. Congdon

Inventor:
Samuel Teachout.

N. PETERS, PHOTO-LITHOGRAPHER, WASHINGTON, D. C.

UNITED STATES PATENT OFFICE.

SAMUEL TEACHOUT, OF NORWICH, CONNECTICUT, ASSIGNOR TO JAMES P. COLLINS.

IMPROVEMENT IN WATER-WHEELS.

Specification forming part of Letters Patent No. 91,792, dated June 22, 1869; reissue No. 6,940, dated February 22, 1876; application filed January 26, 1876.

*To all whom it may concern:*

Be it known that I, SAMUEL TEACHOUT, formerly of the city of Troy, in the county of Rensselaer and State of New York, now of the city of Norwich, in the county of New London and State of Connecticut, have invented certain new and useful Improvements in Water-Wheels; and I do hereby declare the following to be a full, clear, and exact description of the same, reference being hereby had to the accompanying drawings, which form and make a part of this my specification.

Figure 1:
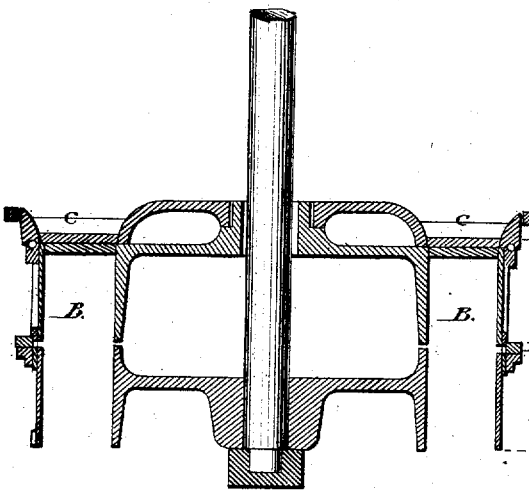
Figure 2:
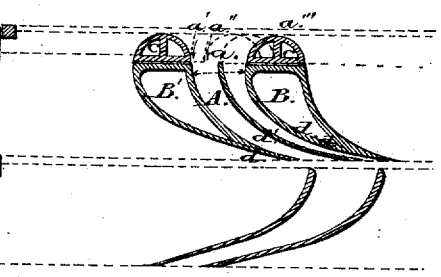

Figure 1 represents a sectional view of a water-wheel. Fig. 2 is a view showing the pitches or chutes and buckets of a water-wheel; also, an intermediate chute or plate constructed in accordance with my invention and improvements, more fully hereinafter described and set forth.

The nature of my said invention and improvements consists in the intermediate stationary pitches or plates placed between the main pitches or chutes of a water-wheel, as hereinafter described and set forth.

The object of my invention is to render all water-wheels to which the water is admitted through pitches or chutes, and in which the quantity of water is regulated by a gate or gates having slots or openings, more effective for fluctuating streams, by producing a more useful effect of the water discharged when the gate is partially closed, for, by the use of my invention, as the quantity of water decreases the space through which it passes can be also reduced, thus confining the water closely, and delivering it to the wheel in full packed veins.

When the intermediate pitch or plate is used it may be placed at a point proportional to the quantity of water in dry seasons or to the variation of the power required.

Suppose, for example, that *a*, Fig. 2, is that point, and the gate C is closed in the same proportion, as shown by dotted lines at Fig. 2, the water would then pass through the opening *d d′* with the same relative velocity to that of the wheel as when the gate was fully open, and the contraction of the vein remains as perfect as before, while, were it not for the intermediate chute or plate A, the gate must be closed at some point, as shown by dotted lines at *a″*, Fig. 2, proportional to *d d′*, Fig. 2, the distance between the main pitch or chute B′ and the intermediate chute or plate A, in order that the wheel may use proportionally less water; and since the opening of the gate thus shown and the main pitch or chute B′ determines the quantity of water used, and since the opening between the main pitches or chutes B′ B is much greater than *a′ a″*, the relative velocity of the water and wheel becomes changed, and therefore the maximum effect cannot be produced; also, since the opening *a′ a″* through which the water enters is suddenly changed in the pitches or chutes to that of *a′ a‴*, there is a great loss of effect by eddying motion, it being a principle of hydraulics that any intermediate enlargement of the opening through which the water passes is detrimental to its useful effect.

If desired, two or more intermediate plates or chutes may be used, according to the circumstances of the case.

I distinctly state that I do not confine myself to the style of wheel as shown, but believe myself to be the inventor of the stationary division as arranged and claimed in any and all water-wheels.

Having thus described the nature of my said inventions and improvements, what I claim, and desire to secure by Letters Patent of the United States, is—

1. An auxiliary or intermediate stationary pitch or plate, A, placed between the main pitches or chutes B′ B of a water-wheel, for the purpose herein described.

2. The combination of an auxiliary or intermediate stationary pitch or plate A with the gate C, said gate admitting the water through slots or openings to the pitches or chutes, substantially as described.

SAMUEL TEACHOUT.

Witnesses:

ALLEN TENNY,

WILLIAM S. CONGDON.